(12) United States Patent
Meagher

(10) Patent No.: US 7,550,078 B2
(45) Date of Patent: Jun. 23, 2009

(54) SKIMMER COVER AND HELICAL RAMP APPARATUS

(76) Inventor: Brian M. Meagher, 1 Ryan's La., York, ME (US) 03902

( * ) Notice: Subject to any disclaimer, the term of this patent is extended or adjusted under 35 U.S.C. 154(b) by 0 days.

(21) Appl. No.: 11/974,214

(22) Filed: Oct. 12, 2007

(65) Prior Publication Data

US 2009/0120856 A1    May 14, 2009

(51) Int. Cl.
*E04H 4/06* (2006.01)
*E04H 4/14* (2006.01)
(52) U.S. Cl. .................................. 210/167.1; 4/496
(58) Field of Classification Search ............. 210/167.1, 210/167.12, 167.19, 416.1, 416.2; 4/496
See application file for complete search history.

(56) References Cited

U.S. PATENT DOCUMENTS

| 4,325,462 | A | * | 4/1982 | Gouzos | 182/93 |
| 5,377,623 | A | * | 1/1995 | Parr | 119/221 |
| 5,862,541 | A | * | 1/1999 | Mailhot | 4/496 |
| 6,321,689 | B1 | * | 11/2001 | Fulmer | 119/706 |

* cited by examiner

*Primary Examiner*—Fred Prince

(57) ABSTRACT

A device to allow animals trapped in a swimming pool skimmer to escape via a helical ramp integrally attached to a skimmer cover with an exit hole in the top. The invention provides for the replacement of an existing skimmer cover with the said invention to provide a simple hassle free solution to the drowning of small animals that get caught in the skimmer assembly.

1 Claim, 4 Drawing Sheets

SKIMMER COVER AND HELICAL RAMP APPARATUS

BACKGROUND OF THE INVENTION

The trapping and subsequent drowning of a variety of small animals in swimming pool skimmers has been and continues to be a large problem for pool owners. As animals jump or fall into the pool, especially during rainy spells, they become trapped. After struggling for hours they eventually get trapped in the pool skimmer assembly and drown.

The drowning of these small animals present a variety of problems to the pool owner mainly:

a) the dead animals are unpleasant to remove and dispose of
b) the dead animals require an excessive amount of chlorination chemicals to deal with the decomposition
c) needlessly kills off vital members of our Eco system The invention provides a hassle free method by which the trapped animals can escape on their own by using this inventions skimmer cover and helical ramp assembly.

There have been several attempts at solving this problem by other U.S. patents issued mainly U.S. Pat. No. 5,377,623 and U.S. Pat. No. 6,796,864. These two patents provide means for frogs and other animals to climb onto a pad or other area prior to the critter arriving at the pool skimmer assembly. While these methods may have some success they present other issues for the pool owner and do not address the issue of the animals in the skimmer itself.

U.S. Pat. No. 5,862,541 further addresses this problem by providing an exit ramp apparatus added to the skimmer basket area. The complexity of this design and the additional effort needed by the pool owner make this solution less effective than that of this invention. The chances of an animal finding the end of the ramp is reduced in effect as compared to the helical ramp hugging the side wall of the skimmer housing of this invention. As water flows radially down into the skimmer it naturally forces the small critters against the ramp which radiated upwardly along the side wall of the skimmer housing. U.S. Pat. No. 5,862,541 only allows for the manual positioning of the ramp location and if the animal misses the ramp upon entering the skimmer basket it is out of luck.

This invention also provides for a much lower profile ramp due to the helical design. The slope of the ramp is much less as the effective length can be much longer as it follows the inside circumference of the skimmer housing. This reduced slope of the ramp is important as it provides a much easier exit for the animal in this slippery turbulent environment. The ramp of U.S. Pat. No. 5,862,541 is linear and the slope is dictated by the diameter of the skimmer assembly.

One other important feature of this invention is its simplicity and ease of use for the pool owner. This invention simply replaces existing pool skimmer covers or is purchased from the OEM at installation. U.S. Pat. No. 5,862,541 is an additional item needed by the pool owner and must be installed correctly, adjusted and maintained. The helical exit ramp of the current invention is attached to the skimmer cover and is effectively one piece. All pool owners must remove the skimmer cover on a regular basis to clean out leaves and other debris caught in the basket. With U.S. Pat. No. 5,862,541, debris will get caught in the mechanism and must be cleaned, repositioned and reattached. With the current invention, the simple act of removing the cover to clean the basket allows debris to fall away and the cover is replaced without thought or additional effort being required as the ramp is simply part of the cover.

SUMMARY OF THE INVENTION

The present invention is an assembly of two components comprising:

A. The skimmer cover is simply a cover designed to fit existing pool skimmer assemblies. These existing skimmer covers may be round or square shape, crowned or flat or any combination of size and shape. The cover itself is not important to the present invention design except for the integration of an opening and snap fit design to accept the helical ramp. Said snap fit feature is a simple means of attaching the ramp in a structural and functional manner. The cover is further enhanced by the placement of an exit opening placed at the radial outward edge of the cover to maximize the ramp diameter. The placement is dictated by the particular skimmer assembly that the cover is designed for to allow for the proper placement of the ramp along the inside diameter of the skimmer enclosure.

B. The helical ramp provides an inclined plane for the animal to scale to the exit opening. The helical ramp is to be rigidly attached to the cover opening area by aforementioned snap fit feature. From this attachment point the ramp radiates counter clockwise downwardly in a screw like fashion. As the ramp comes around on itself, the radial dimension then decreases, collapsing inwardly as to allow the component to be molded simply and not cause an undercut condition in the tooling required. The said radially collapsing ramp ends below water level with a flat rest area. As the ramp continues downwardly, the diameter is maximized to fit the inside diameter of the pool skimmer housing until such point as it interferes with the start point of itself. At that point the radial dimension then decreases to allow the helical form to continue downwardly without interference.

DETAILED DESCRIPTION OF THE PREFERRED EMBODIMENT

Figure 1:
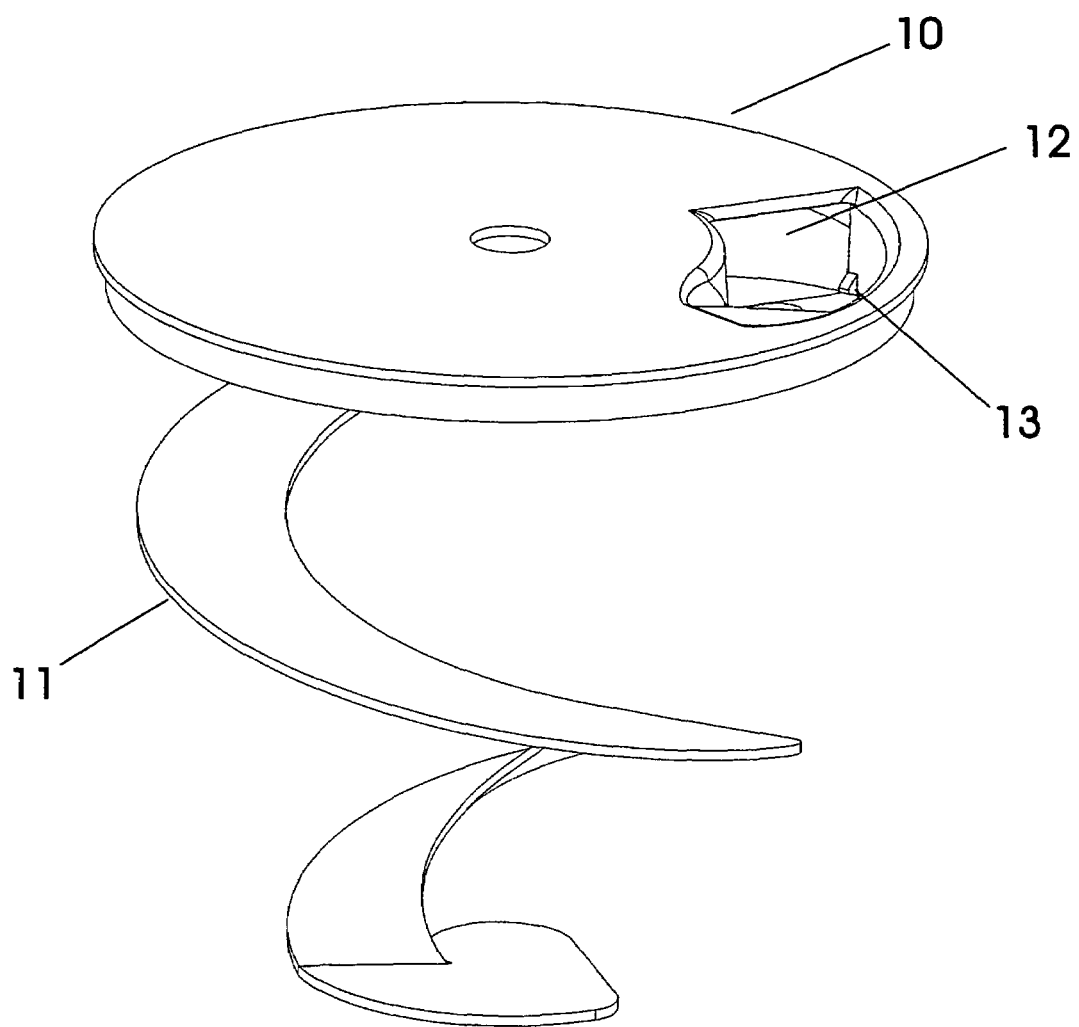
FIG. 1 is a an Isometric view of the Skimmer Cover and Helical Ramp assembly apparatus
Figure 4:
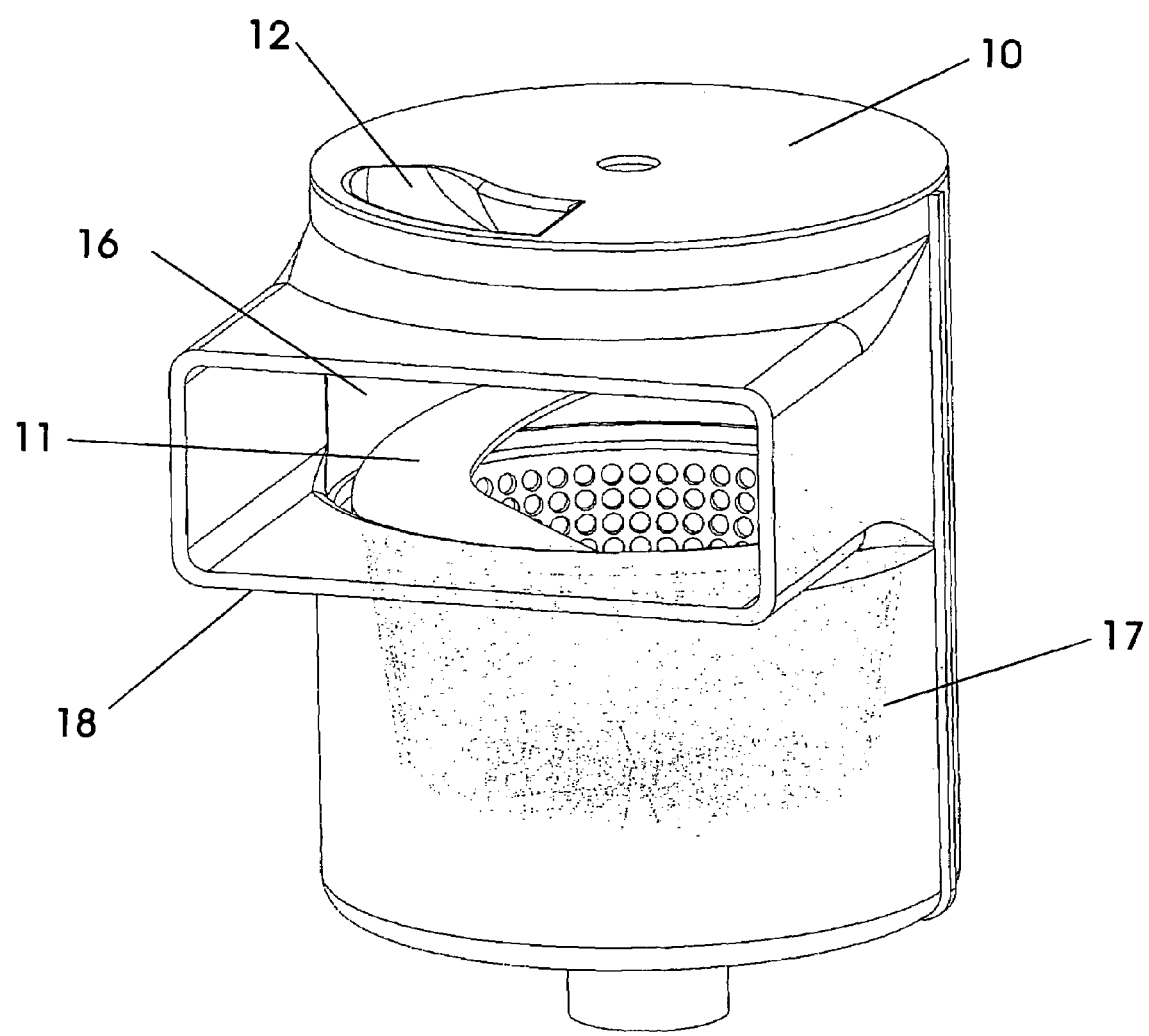
FIG. 4 is an assembly view of a Skimmer Housing, Skimmer Basket and the current invention

As seen in FIG. 1, the skimmer cover and helical ramp assembly consists of cover 10 and helical ramp 11. Ramp 11 is attached to cover 10 by a snap fit feature 13 at opening location 12. Said snap fit feature is of common design for injection molding and need only securely fasten the ramp to the cover in a simple and convenient manner. Hole opening 12 allows the animals to escape from the skimmer assembly. The location of hole 12 is determined by the diameter of the skimmer housing 16 as shown in FIG. 4. Ramp 11 outer diameter is also determined by the skimmer housing diameter 16. These two dimensions are simply determined by the maximum diameter that ramp can be designed for that will allow ramp 11 to fit loosely inside of the skimmer housing 16.

Figure 2:
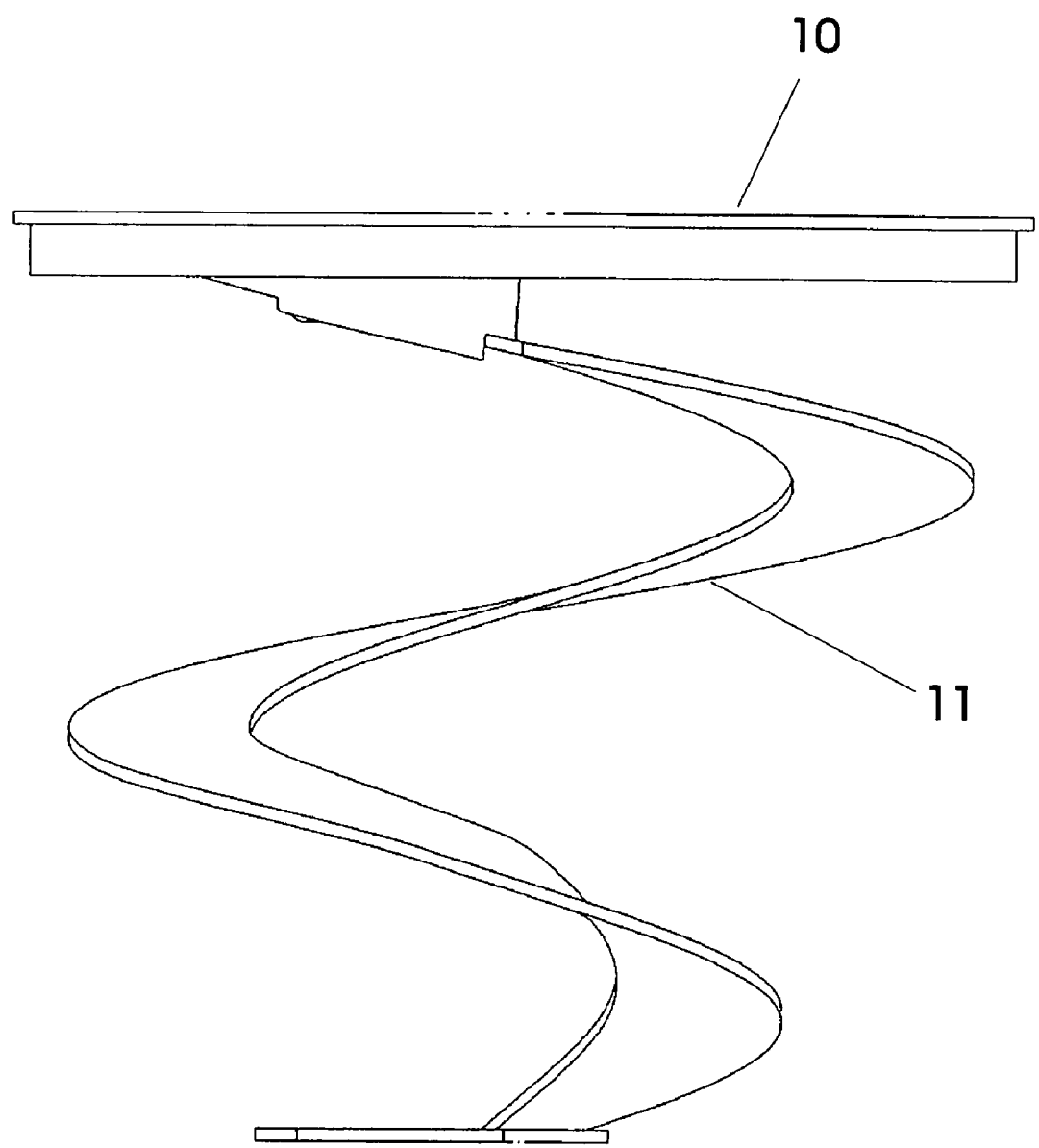
FIG. 2 is a front view of the of the Skimmer Cover and Helical Ramp assembly apparatus.
Figure 3:
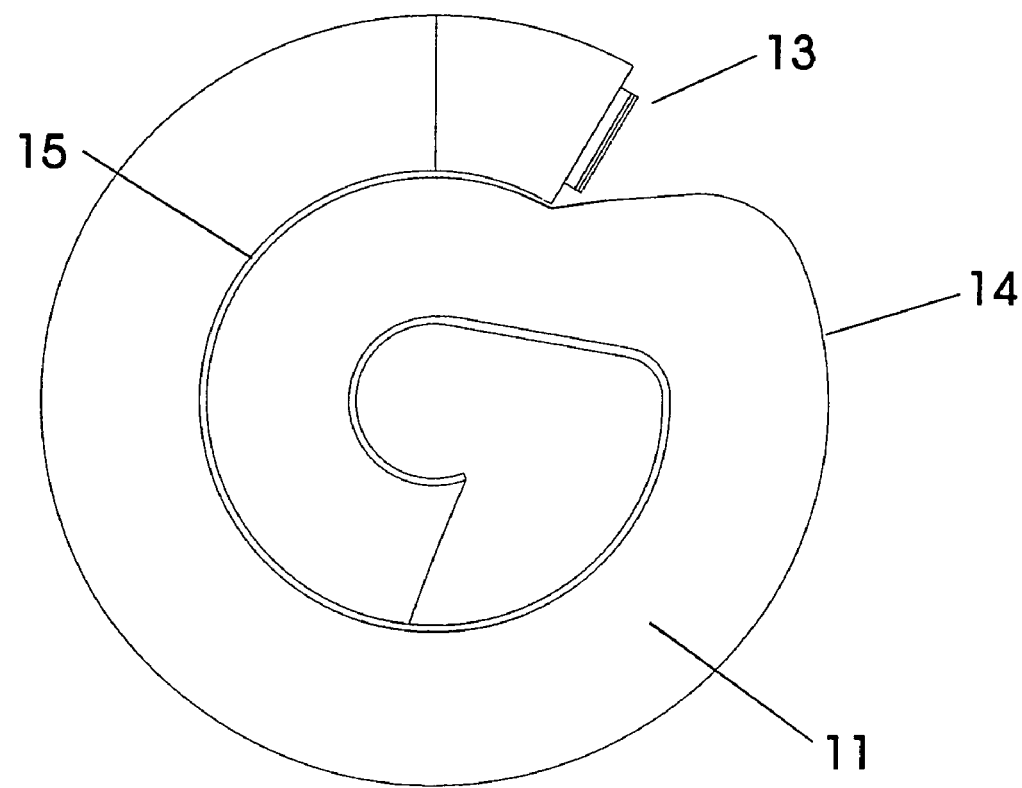
FIG. 3 is a top view of the Helical Ramp apparatus.

FIG. 2 shows a simple front view of the assembled cover 10 to ramp 11. The shallow slope of ramp 11 can be seen in this view. As ramp 11 spirals downward from cover 10, the diameter 14 remains constant until the ramp comes around on its self as shown in FIG. 3. In order not to be die locked in the molding process the diameter 14 must be reduced to diameter 15 as the ramp continues to spiral downward. This spiral effect continues downward to a level below the operating level of the skimmer assembly it is designed for and ends in the center area of the skimmer basket 17. Note that the skimmer cover 10 and helical ramp 11 are not attached in any way to skimmer basket 16 17.

FIG. 4 shows an assembly of the skimmer cover 10 and helical ramp 11 installed in a skimmer housing 16 with a skimmer basket 17 in place. As water flows into opening 18 the small animals will be forced onto ramp 11 and be trapped between skimmer housing wall 16. If the animal first misses the ramp 11 the radial current of the water being drawn into opening 18 will continue to give ample opportunity to the animal to grab hold of ramp 11 and climb upward to exit at opening 12.

I claim:

1. A swimming pool skimmer cover assembly having a predetermined size and shape configured for attachment to a skimmer housing having side walls and a skimmer basket with a center area within said housing, said skimmer cover comprising:

a) an integrally attached helical ramp having a flat centrally located pad at one end, said ramp sized to fit inside said skimmer housing such that said pad area is suspended in said center area of said skimmer basket, said ramp radiating spirally down to below a water level inside said skimmer housing to form an inclined plane against said side walls of said skimmer housing to allow small animals caught in a skimmer current to exit to a pool deck and wherein said ramp is molded from plastic and is configured for collapsing radially inwardly as said ramp projects to said water level;

b) an integrally molded opening where said animals exit said cover; and c) an integrally molded snap fit feature configured for attaching said helical ramp to said cover opening such that said helical ramp is suspended from said cover only.

* * * * *